United States Patent
Braun

[11] Patent Number: 5,875,820
[45] Date of Patent: Mar. 2, 1999

[54] FUEL FEEDING DEVICE FOR VEHICLES

[75] Inventor: Hans-Peter Braun, Renfrizhausen, Germany

[73] Assignee: Robert Bosch GmbH, Stuttgart, Germany

[21] Appl. No.: 924,876

[22] Filed: Sep. 5, 1997

[30] Foreign Application Priority Data

Sep. 13, 1996 [DE] Germany .......... 196 37 276.3

[51] Int. Cl.$^6$ .................. F16L 7/00; F16L 33/20
[52] U.S. Cl. .......... 138/109; 138/111; 138/114; 285/242; 285/243
[58] Field of Search .................. 139/109, 103, 139/111–114; 285/242–244, 255

[56] References Cited

U.S. PATENT DOCUMENTS

| | | | |
|---|---|---|---|
| 4,603,888 | 8/1986 | Goodall et al. | 285/243 X |
| 4,635,973 | 1/1987 | Sauer | 285/243 X |
| 4,963,133 | 10/1990 | Whipple | 285/243 X |
| 5,074,600 | 12/1991 | Weinhold | 285/243 |
| 5,131,687 | 7/1992 | Marchou | 285/242 X |
| 5,140,738 | 8/1992 | Pinkerman, Jr. | 285/243 X |
| 5,209,527 | 5/1993 | Hohmann et al. | 285/242 |

FOREIGN PATENT DOCUMENTS 195 47 876  12/1995  Germany .

*Primary Examiner*—Patrick F. Brinson
*Attorney, Agent, or Firm*—Michael J. Striker

[57] ABSTRACT

A fuel feeding arrangement for a motor vehicle has at least one fuel feeding component having a pipe provided with at least one outwardly projecting collar, at least one fuel conduit mountable on the pipe and formed as a tube, the tube having an end mountable at least directly on the pipe, a mounting element fixed on the end of the tube and displaceable on the pipe and having a springy locking element which is engageable on the at least one collar.

8 Claims, 3 Drawing Sheets

FUEL FEEDING DEVICE FOR VEHICLES

BACKGROUND OF THE INVENTION

The present invention relates to a fuel feeding device for vehicles.

A fuel feeding device for vehicles is disclosed for example in the German document DE 195 47876. This fuel feeding device has a fuel conduit formed as a tube and connecting their components with one another or with the internal combustion engine of the motor vehicle.

The tube has at least one collar which projects outwardly from its periphery and is displaceable on a pipe of a component of the fuel feeding device or the internal combustion engine. With the mounting of the tube in the first assembly for the motor vehicle, it can be warmed up and therefore expanded so that it can not be displaced on the pipe. During the subsequent cooling, it can be jammed on at least one collar of the pipe and therefore retained on it. In the first assembly the required special devices for mounting of the tube can be efficiently utilized. A dismounting of the tube is possible only by a destruction, and at least a collar of the pipe is damaged during this process. Therefore, no new tubes can be reliably and tightly mounted on it, and a mounting of a new tube in the case of repair in a workshop is possible only with high expenses. In the above mentioned patent document it is provided that the tube is separated from the pipe and its remaining piece is left on the pipe, so that a hose can be mounted on it for a new fuel conduit. Hoses have disadvantages when compared with tubes as fuel conduits. They are very expensive because they have to be composed of fuel resistant materials. Moreover, the mounting of the hose is expensive since at least a hose shell must be mounted on the pipe for fixing of the hose.

SUMMARY OF THE INVENTION

Accordingly, it is an object of the present invention to provide a fuel feeding device of the above mentioned general type which avoids the disadvantages of the prior art.

In keeping with these objects and with others which will become apparent hereinafter, one feature of present invention resides, briefly stated, in a fuel feeding device, in which a mounting element is fixed on an end of the tube which is mountable at least directly on the pipe, it is displaceable on the pipe, and has at least one springy locking element which is arrestable on at least one collar.

When the fuel feeding device is designed in accordance with the present invention, the fuel conduit is formed as a tube in a simple manner and can be mounted on the pipe without additional means. The tube mountable on the pipe by a mounting element can be utilized, or alternatively in the first assembly as mentioned above a tube can be directly mounted on the pipe, and only in the case of repair a replacement tube with the mounting element can be connected with the pipe.

In accordance with another embodiment of the present invention, the pipe at its free end has a smoothly formed region on its periphery, the end of the tube is displaceable on this region, and an electrically deformable sealing element is clamped between this region and the tube. This provides for a reliable sealing between the pipe and the tube.

In accordance with still a further feature of the present invention, at least one locking element is formed of one piece with the portion of the mounting element which is displaceable on the pipe, and shaped as a finger which inwardly projects from it. In this way a simple fixing of the mounting element on the tube is provided.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
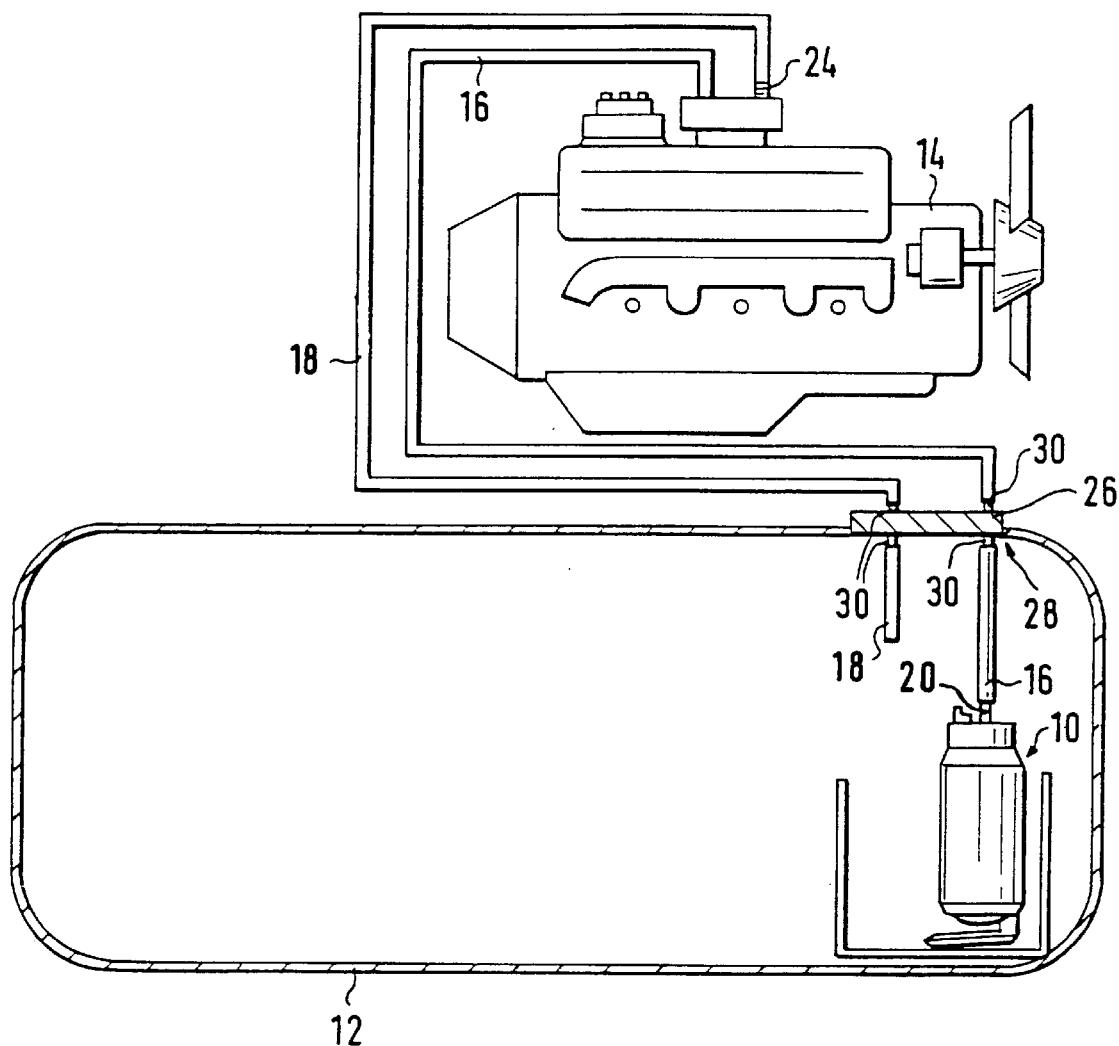
FIG. 1 is a simplified view of a fuel feeding device in accordance with the present invention.

A fuel feeding device which is shown in a simplified way in FIG. 1 is provided for a motor vehicle. It has a fuel feeding aggregate 10 which supplies the fuel from a supply container 12 to an internal combustion 14 of the motor vehicle. The fuel feeding aggregate 10 is connected through a fuel conduit 16 with the internal combustion 14. It is mounted on a pipe 20 of the fuel feeding aggregate 10. In addition to the fuel feeding aggregate, the fuel arrangement can also include a return conduit 18 from the internal combustion engine 14 into the supply container 12. It is used for returning into the supply container 12 of a fuel which is not used by the internal combustion engine 14. The return conduit 18 is also formed as a fuel conduit which is mounted on a pipe 24 on the internal combustion engine 14 and/or a pipe 24 on the supply container 12.

Moreover, the fuel feeding device can have a flange 26, for closing an opening 28 in the supply container 12. The flange 26 has a pipe 30. Portions of the fuel supply conduits 16 and/or 22 located inside and outside of the supply container 12 are mounted on the pipe 30. Finally, the fuel feeding device, additionally or alternatively to the above described components, can have other components on which a pipe of a fuel conduit can be mounted as well.

The design of the pipe 20 of the fuel feeding aggregate 10 and the fuel conduit 16 mounted on it is described as an example, which can be used in the say way for all other pipes and fuel conduits of the fuel feeding device. The fuel conduit 16 is formed as a tube and composed of a fuelresistant material. The tube is not flexible, but instead is relatively rigid. The tube 16 can be formed as a so-called corrugate tube. At least in portions 17 it is corrugated, and in these portions it is bendable. Thereby the tube in its extension can be flexibly adjusted to the corresponding mounting condition.

The cylindrical pipe 20 is composed of a fuel-resistant and synthetic plastic material or metal and is provided on its outer periphery with at least one outwardly projecting collar 34. Preferably, several collars 34 which are offset relative to one another in direction of the longitudinal axis 21 of the pipe 20 can be provided as well. The collars 34 are inclined at their side 35 which face the free end 22 of the pipe 20. Their opposite sides 36 are substantially perpendicular to the longitudinal axis 21. The pipes 21 have a pine tree-like shape with tips facing the free end 22 of the pipe 20. At its free end 22 the pipe 20 has a smooth region 23 on its outer periphery.

Figure 2:
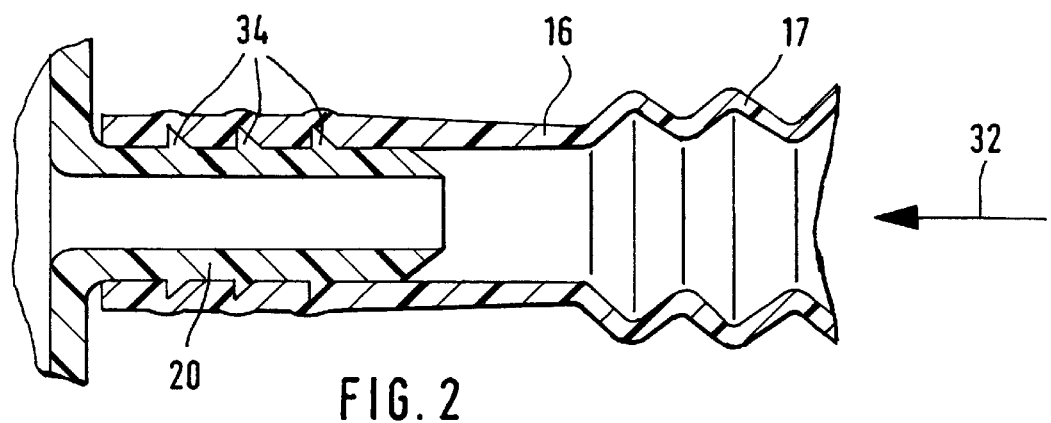
FIG. 2 is an enlarged view of a tube which serves as a fuel conduit arranged on a pipe, in a longitudinal section.

During mounting of the fuel feeding device for the initial assembly of the motor vehicle, it can be provided that the tube 16 is displaced with its end directly onto the pipe 20 as shown in FIG. 2. For its mounting on the pipe 20, the tube 16 is heated in its end region, so that it is expanded and can be fitted onto the pipe 20 in direction of the arrow 32. The displacement of the tube 16 is facilitated by the inclined sides 35 of the collar 34. During the subsequent cooling, the tube 16 shrinks, and the collar 34 is jammed in it so that the synthetic plastic material of the tube is set. The tube 16 is held by the collar 34 on the pipe 20, so that it can not be displaced anymore. Alternatively, the tube 16 can be mounted without heating on the pipe 20, and its end is pressed by corresponding force application onto the pipe 20.

Alternatively to the above described embodiment, during mounting of the fuel feeding device for the first assembly of the vehicle or in the case of required repair of components of the fuel feeding device during a new mounting of the fuel feeding device, another embodiment of the mounting of the tube 16 on the pipe 20 can be provided as explained hereinbelow. In the case repair, the originally inserted tube 16 must be completely removed from the pipe 20, and thereby a new tube can be mounted on it.

Figure 3:
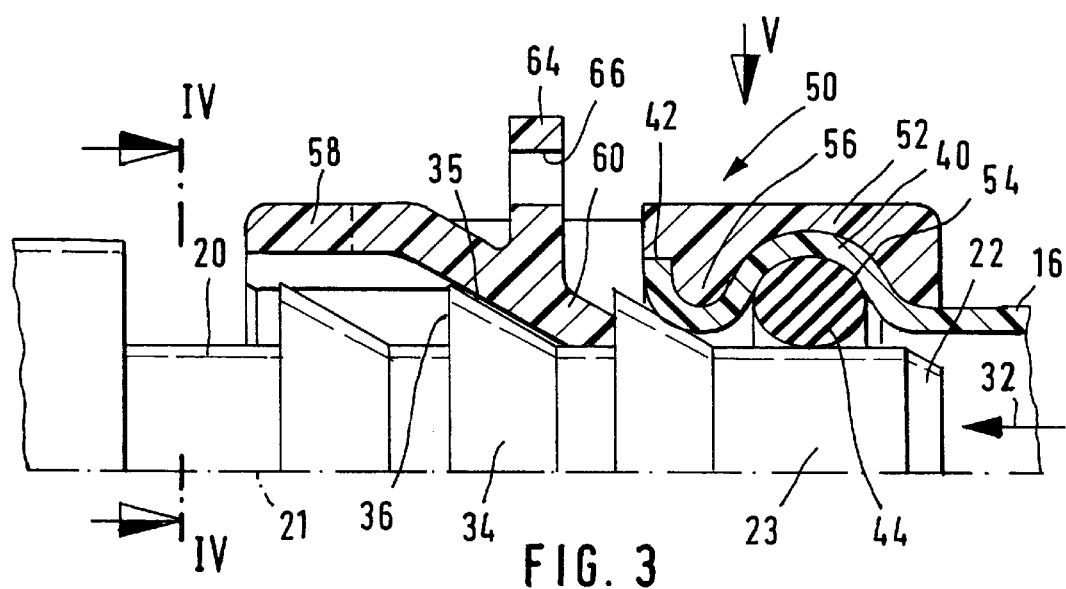
FIG. 3 is a view showing the tube connected with the pipe, in a longitudinal section, with a mounting element in accordance with the present invention.

The tube 16 has an outwardly projecting bead 40 located near its end mounted on the pipe 20. Additionally, the end 42 of the tube 16 is bent radially outwardly as shown in FIG. 3. A mounting element 50 is fixed on the region of the tube 16 and formed for example as a sleeve. It is mounted on the pipe 20 through the tube 16. The mounting element 50 is composed for example of fuel-resistant synthetic plastic material and produced by injection molding. The mounting element 50 has a portion 52 arranged in the end region of the tube 60. A recess 54 is formed in an inner periphery of this portion, and the bead 40 of the tube 16 engages in the recess. In addition the portion 52 of the mounting element 50 can have an inwardly extending projection 56 which engages in a depression formed between the bead 40 and the bent end 42 of the tube 16. The mounting element 50 is fixed on the tube 16 by the bead 40 which engages in its recess 54 and by the projection 56 engaging in the depression on the tube 16. In the end region of the tube 16, an elastically deformable sealing element 44 engages in a ring-shaped depression formed by the bead 40. The sealing element 44 is formed as a sealing ring, preferably as an 0-ring.

Figure 4:
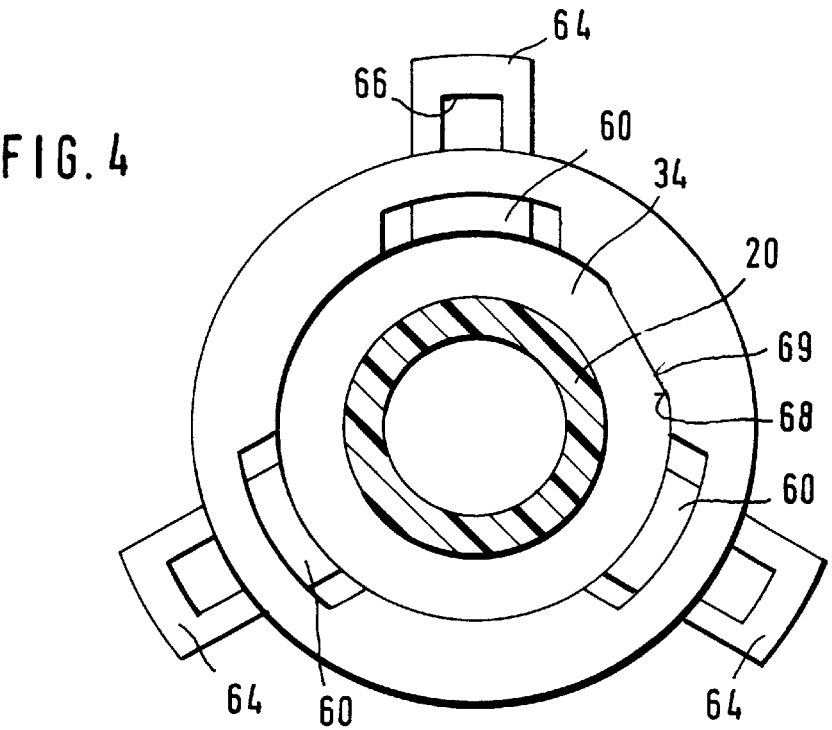
FIG. 4 is a view showing the pipe with the tube and the mounting element in a cross-section taken along the line IV—IV in FIG. 3.
Figure 5:
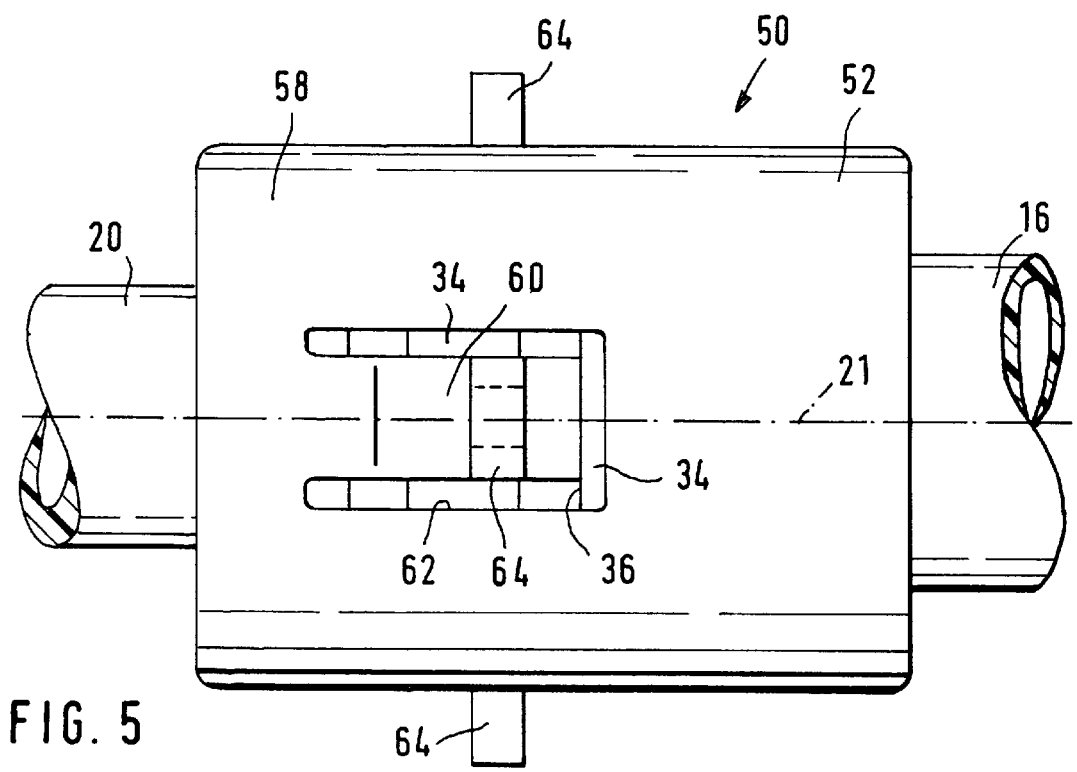
FIG. 5 is a view showing the mounting element with the pipe and the tube on a view in direction of the arrow 5 in FIG. 3.

The mounting element 50 also has a portion 58 which extends over the end 42 of the tube 16 and is displaceable on the pipe 20. The portion 56 has an inner diameter which substantially corresponds to the cross-section of the pipe 20 over its collar 34 or is smaller than this cross-section. At least one springy locking element 60 is arranged on the portion 58 of the mounting element 50. It is engageable on the side 36 of the collar 34. The locking element 60 is formed by an inwardly projecting finger which is of one-piece with the portion 58 of the mounting element 50. The finger 60 is arranged, at its end facing the displacing direction 32 of the pipe 16, of one-piece on the portion 58. At its remaining locations, as shown in FIG. 5, it is separated by a U-shaped slot 62 from the portion 58. The finger 60 extends to a free end opposite to the displacement direction 32 to the longitudinal axis 21 of the pipe 20 inwardly. The free end of the finger 60 extends radially farther inwardly than the outer edges of the collar 34. A radially outwardly extending projection 64 is arranged on the finger 60 and provided with an opening 66. As can be seen from FIG. 4, several locking elements 60, for example three can be distributed over the periphery of the mounting element 50.

During mounting of the tube 16 on the pipe 20, the portion 58 of the mounting element 50 is displaced in the direction of the arrow 32 on the pipe 20. The free end of the finger 60 slides over the inclined slides 65 on the collar 34 and turns farther springy inwardly after passing the outer most edge of the collar 34. The end position of the mounting element 50 is determined in that, the end 42 of the tube 16 abuts against the collar 34 arranged the closest to the free end 21 of the pipe 20 at its side 35. The sealing ring 44 between the smooth region 23 of the pipe 20 and the tube 16 is clamped and tightly sealed. The fingers 34 are engaged with their free ends at the sides 36 of the collar 34 and secure a mounting element 50 and thereby the tube 16 again pulling out opposite to the direction of the arrow 32.

For dismounting of the tube 16, the finger 60 can engage on the projection 16, for example by engaging with a tool in its openings 66. The fingers 60 are pulled radially outwardly, so that their free ends no longer engage on the collar 34 and the tube 16 can be withdrawn opposite to the direction of the arrow 32.

It can be provided that the mounting element 50 can be arranged only in a predetermined rotary position on the pipe 20, whereby a rotation of the mounting element 50 on the pipe 20 is prevented. For this purpose, for example the portion 58 of the mounting element 50 can be provided on its inner periphery with at least one flattening 68, and the pipe 20 on its outer periphery can be provided with at least one corresponding flattening 69. Thereby the mounting element 50 can be fitted-on only in such a rotary position, in which both flattenings 68, 69 correspond to one another and a rotation of the mounting element 50 on the pipe 20 is prevented.

It will be understood that each of the elements described above, or two or more together, may also find a useful application in other types of constructions differing from the types described above.

While the invention has been illustrated and described as embodied in fuel feeding device for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fuel feeding arrangement for a motor vehicle, comprising at least one fuel feeding component having a pipe provided with at least one outwardly projecting collar; at least one fuel conduit mountable on said pipe and formed as a rigid tube, said tube having an end mountable at least directly on said pipe; a mounting element fixed on said end of said tube and displaceable on said pipe and having a springy locking element which is engageable on said at least one collar, said pipe having a free end and being provided at said free end with a region having a smooth outer periphery, said end of said tube being fittable on said region of said pipe; and an elastically deformable sealing element provided between said region and said tube, said mounting element being sleeve-shaped and having an end portion fixable on an end region of said tube and a portion fittable on said pipe, said locking element being arranged on said portion fittable on said pipe, said tube having an end portion provided with an outwardly projecting bead, said end portion of said mounting element fixable on said tube having an inner periphery provided with at least one recess in which said at least one bead engages for fixing of said mounting element, said tube being provided only with said mounting element which is held on said bead and with said sealing element arranged in said tube and with no other parts.

2. A fuel feeding arrangement as defined in claim 1, wherein said tube has an inner periphery provided with a depression which is formed by said at least one bead, said sealing element being arranged in said depression.

3. A fuel feeding arrangement as defined in claim 1, wherein said tube has an inner periphery provided with a depression which is formed by said at least one bead, said sealing element being arranged in said depression.

4. A fuel feeding arrangement as defined in claim 1, wherein said at least one locking element is formed of one-piece with a portion of said mounting element which is fittable on said pipe and shaped as an inwardly projecting finger.

5. A fuel feeding arrangement as defined in claim 1, wherein said locking element includes a plurality of several locking members which are distributed over a periphery of said mounting element.

6. A fuel feeding arrangement as defined in claim 1, wherein said pipe has a plurality of such collars which are offset relative to one another in a direction of a longitudinal axis of said pipe.

7. A fuel feeding arrangement as defined in claim 1, wherein said mounting element is composed of a synthetic plastic material.

8. A fuel feeding arrangement as defined in claim 1, wherein said mounting element is formed as an injection molding-produced element of a synthetic plastic material.

* * * * *